United States Patent
Marinkovic et al.

(10) Patent No.: US 9,686,251 B2
(45) Date of Patent: Jun. 20, 2017

(54) DEVICES AND TECHNIQUES FOR CONTROLLING DISCLOSURE OF SENSITIVE INFORMATION

(71) Applicant: IGT UK Interactive Limited, London (GB)

(72) Inventors: Slobodan Marinkovic, Beograd (RS); Goran Vuckovic, Scotland (GB); Amir Zolic, Belgrade (RS); Maja Maljkovic, Belgrade (RS)

(73) Assignee: IGT UK INTERACTIVE LTD., London (GB)

( * ) Notice: Subject to any disclaimer, the term of this patent is extended or adjusted under 35 U.S.C. 154(b) by 0 days.

(21) Appl. No.: 14/487,624

(22) Filed: Sep. 16, 2014

(65) Prior Publication Data

US 2015/0082022 A1    Mar. 19, 2015

Related U.S. Application Data

(60) Provisional application No. 61/879,095, filed on Sep. 17, 2013.

(51) Int. Cl.
| | |
|---|---|
| *H04L 29/06* | (2006.01) |
| *G06Q 20/38* | (2012.01) |
| *G06Q 20/34* | (2012.01) |
| *G06Q 20/42* | (2012.01) |
| *G06F 11/30* | (2006.01) |
| *G06F 12/14* | (2006.01) |

(52) U.S. Cl.
CPC ....... *H04L 63/0442* (2013.01); *G06Q 20/341* (2013.01); *G06Q 20/3823* (2013.01); *G06Q 20/3829* (2013.01); *G06Q 20/425* (2013.01); *H04L 63/0464* (2013.01)

(58) Field of Classification Search
None
See application file for complete search history.

(56) References Cited

U.S. PATENT DOCUMENTS

| | | | | |
|---|---|---|---|---|
| 8,364,984 | B2* | 1/2013 | Jeffries | G06F 21/6209 709/229 |
| 8,898,452 | B2* | 11/2014 | Plotkin | G06F 21/6236 380/277 |
| 2002/0081995 | A1* | 6/2002 | Leppinen | H04L 29/06 455/412.1 |
| 2005/0021938 | A1* | 1/2005 | Kidokoro | H04L 63/0428 713/152 |
| 2005/0039034 | A1* | 2/2005 | Doyle | H04L 9/0825 713/193 |

(Continued)

*Primary Examiner* — Trang Doan
(74) *Attorney, Agent, or Firm* — Sage Patent Group

(57) ABSTRACT

Devices and techniques for controlling disclosure of sensitive information are provided. A request for information may be received through a first communication channel. The request may be provided using an account of a user. First encrypted data, which includes the requested information and has been encrypted with a first asymmetric encryption key, may be decrypted. The decrypted information may be re-encrypted with a second asymmetric encryption key different from the first asymmetric encryption key to obtain second encrypted data comprising the information. The second encrypted data may be sent to the user through a second communication channel different from the first communication channel.

22 Claims, 4 Drawing Sheets

(56) References Cited

U.S. PATENT DOCUMENTS

| | | | |
|---|---|---|---|
| 2005/0283614 A1* | 12/2005 | Hardt | H04L 63/0823 |
| | | | 713/182 |
| 2007/0101420 A1* | 5/2007 | Masui | H04L 9/3268 |
| | | | 726/10 |
| 2007/0233606 A1* | 10/2007 | Zweig | G06F 21/10 |
| | | | 705/57 |
| 2009/0100268 A1* | 4/2009 | Garcia | G06F 21/6209 |
| | | | 713/184 |
| 2009/0276474 A1* | 11/2009 | Sela | G06F 17/30218 |
| 2009/0276829 A1* | 11/2009 | Sela | G06F 21/10 |
| | | | 726/2 |
| 2010/0030982 A1* | 2/2010 | Sela | G06F 21/10 |
| | | | 711/162 |
| 2011/0197059 A1* | 8/2011 | Klein | H04L 9/083 |
| | | | 713/155 |
| 2011/0202755 A1* | 8/2011 | Orsini | H04L 63/029 |
| | | | 713/151 |
| 2013/0073854 A1* | 3/2013 | Patti | H04L 9/0825 |
| | | | 713/171 |

* cited by examiner

DEVICES AND TECHNIQUES FOR CONTROLLING DISCLOSURE OF SENSITIVE INFORMATION

CROSS-REFERENCE TO RELATED APPLICATIONS

This Application claims the benefit under 35 U.S.C. §119(e) of U.S. Provisional Application Ser. No. 61/879,095, titled "Card Decryption with Delivery in a Certificate-Encrypted Document by Email" and filed Sep. 17, 2013, which is hereby incorporated by reference herein in its entirety.

BACKGROUND

When stored in computer systems or transmitted over computer networks, sensitive information may be encrypted to prevent unauthorized parties from gaining access to the information. Asymmetric key encryption techniques are known. With asymmetric key encryption, a public key is used to encrypt data and a corresponding private key is used to decrypt the data. Without the private key, extraction of sensitive information from the encrypted data may be very difficult and/or time-consuming. Thus, encrypting sensitive information with asymmetric key encryption prior to storing or transmitting the data reduces the risk of the information being discovered by an unauthorized party, even if the unauthorized party obtains a copy of the encrypted data.

SUMMARY

According to an aspect of the present disclosure, an apparatus is provided, comprising at least one processing circuit and at least one storage medium storing instructions that, when executed by the at least one processing circuit, cause the apparatus to perform steps including receiving, through a first communication channel, a request for information, the request provided using an account of a user. The steps further include decrypting first encrypted data comprising at least a portion of the requested information, the first encrypted data being encrypted with a first asymmetric encryption key; encrypting the at least a portion of the requested information with a second asymmetric encryption key different from the first asymmetric encryption key to obtain second encrypted data comprising the at least a portion of the requested information; and sending the second encrypted data comprising the at least a portion of the requested information to the user through a second communication channel different from the first communication channel.

According to an aspect of the present disclosure, a system is provided, comprising a first computing device and a second computing device. The first computing device includes at least one first processing circuit and at least one first storage medium storing instructions that, when executed by the at least one first processing circuit, cause the first computing device to perform first steps including receiving, through a first communication channel, a request for information, the request provided using an account of a user. The steps further include decrypting first encrypted data comprising at least a portion of the requested information, the first encrypted data being encrypted with a first asymmetric encryption key, encrypting the at least a portion of the requested information with a second asymmetric encryption key different from the first asymmetric encryption key to obtain second encrypted data comprising the at least a portion of the requested information, and sending the second encrypted data comprising the at least a portion of the requested information to the user through a second communication channel different from the first communication channel. The second computing device is communicatively coupled to the first computing device.

According to an aspect of the present disclosure, a method is provided, comprising receiving, through a first communication channel, a request for information, the request provided using an account of a user. The method further comprises using at least one processor executing stored instructions, applying a decryption protocol to decrypt first encrypted data comprising at least a portion of the requested information, the first encrypted data being encrypted with a first asymmetric encryption key, using at least one processor executing stored instructions, applying an encryption protocol to encrypt the at least a portion of the requested information with a second asymmetric encryption key different from the first asymmetric encryption key to obtain second encrypted data comprising the at least a portion of the requested information, and sending the second encrypted data comprising the at least a portion of the requested information to the user through a second communication channel different from the first communication channel.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
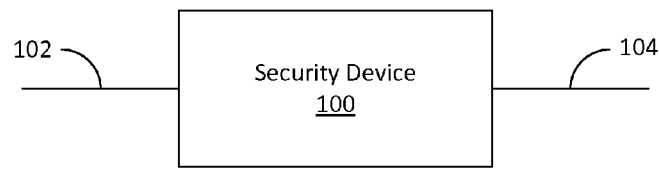
FIG. 1 is a block diagram of a security device 100, according to some embodiments.

In a computer system where sensitive information is processed, the unencrypted sensitive information may be stored in the system's memory while the system uses the information for a legitimate purpose, even if the information is usually stored only in an encrypted form. For example, when sensitive information is entered into a computer system, the unencrypted information may be stored in the system's memory before being encrypted. As another example, when sensitive information is transmitted from a first computer system to a second computer system, the first system may decrypt the information (using a private key) and then re-encrypt the information (using a public key) before transmitting the information, with the unencrypted information being stored in the system's memory between the decryption and re-encryption steps.

Unauthorized parties may attempt to capture unencrypted sensitive information from a computer system's memory. For example, malware uploaded onto a retailer's point-of-sale computer terminals may scrape the unencrypted account information, including card numbers, cardholder names, cardholder addresses, and card security codes (CVV or CVC codes) from the point-of-sale terminals' memories.

One technique for reducing the risk of unencrypted sensitive information being stolen from a computer system's memory is to "harden" the system by implementing security safeguards, such as setting up firewalls, installing intrusion-prevention and/or intrusion-detection systems, removing unnecessary software, and limiting access to the computer system. However, situations may still arise where an authorized entity has a legitimate purpose for accessing the sensitive information in an unencrypted form. For example, operators of computer systems that store encrypted sensitive information may be required to divulge the unencrypted sensitive information for legal reasons (e.g., pursuant to a court order). When conventional techniques are used to divulge unencrypted sensitive information to authorized entities for legitimate purposes, the risk of theft of the sensitive information by unauthorized entities may be unacceptably high.

Thus, there is a need for improved techniques for controlling disclosure of sensitive information (e.g., to authorized entities for legitimate purposes), while limiting the risk of theft of the sensitive information by unauthorized entities. According to an aspect of the present disclosure, techniques for controlling disclosure of sensitive information are provided. In some embodiments, an information repository may store encrypted sensitive information. A small set of trusted entities may be authorized to access the sensitive information in decrypted form. When an authorized entity logs into the information repository and requests sensitive information, the repository may forward the encrypted sensitive information and the request to a hardened computing device which stores the private key needed to decrypt the sensitive information. The hardened computing device may use the private key to decrypt the sensitive information, then re-encrypt the information using a public key corresponding to the authorized entity. The hardened computing device may send the re-encrypted data to the authorized entity through a different channel than the channel by which the authorized entity requested the sensitive information. For example, the hardened server may send the sensitive information to the authorized entity by emailing the re-encrypted data to an email address corresponding to the authorized entity. The authorized entity may then receive the re-encrypted data through the second communication channel, and use the appropriate private key to decrypt the re-encrypted data, thereby obtaining the sensitive information.

Relative to conventional techniques, embodiments of the above-described technique may decrease the risk of the sensitive information being stolen by unauthorized entities. For example, even if the account of an authorized entity were compromised, such that an unauthorized entity could log into the information repository and request sensitive information, the unauthorized entity would not actually obtain the encrypted sensitive information unless the unauthorized entity also had access to the authorized entities emails. Moreover, even if the unauthorized entity had access to the authorized entity's emails, the unauthorized entity would not be able to decrypt the sensitive information without the authorized entity's primary key.

The aspects and embodiments described above, as well as additional aspects and embodiments, are described further below. These aspects and/or embodiments may be used individually, all together, or in any combination, as the application is not limited in this respect.

As used herein, "sensitive information" may include any information which at least one entity desires to be kept secret from at least one other entity, any information which has more value to at least one entity if kept secret from at least one other entity, and/or any information which protects access to property of any kind, including, without limitation, financial information (e.g., account numbers, user names, passwords, and/or personal identification numbers (PINs) for bank accounts, debit cards, credit cards, investment accounts, etc.), debit and/or credit card information (e.g., card numbers, cardholder names, cardholder addresses, PINs, and/or security codes (e.g., CSC, CVD, CVN, CVV, CVV2, CVVC, CVC, CVC2, CCV, SPC, and/or V codes)), authentication information (e.g., user names, passwords, passphrases, and/or other information that may be used to authenticate the identity of a person or a computer user), medical information, etc.

As used herein, "channel" may include a logical and/or physical communication channel between computing devices. A channel may include one or more channel portions, each of which may be implemented using any suitable technique.

As used herein, "payment services providers" (PSPs) may include entities (e.g., banks) that execute payments on behalf of other entities (e.g., customers, subscribers, account holders). Examples of PSPs may include, without limitation, banks, acquiring banks for card transactions, credit unions, intermediate companies between merchants and acquiring banks, Internet Wallet service providers (e.g., PayPal, Neteller, Shill), and/or payment-by-voucher service providers (e.g., Paysafecard, Ecocard, Ukash).

To the extent that the usage of any term in the present disclosure conflicts with the usage of that term in U.S. Provisional Application Ser. No. 61/879,095, incorporated herein by reference, the usage of the term in the present disclosure controls.

FIG. 1 shows a block diagram of a security device 100, according to some embodiments. In some embodiments, security device 100 may store one or more cryptographic keys. The one or more cryptographic keys may include one or more private keys, which security device 100 may use to decrypt encrypted data comprising sensitive information. The one or more private keys may be generated using any suitable technique. In some embodiments, the one or more private keys may be generated by security device 100. In some embodiments, the one or more private keys may never be stored or transmitted outside security device 100. In some embodiments, public keys corresponding to the one or more private keys of security device 100 may be stored in one or more devices (e.g., devices remote from security device 100), which may use the public keys to generate encrypted data which can be decrypted by security module 100. In some embodiments, security module 100 may generate and/or distribute the public keys.

In some embodiments, security device 100 may store contact information for one or more entities authorized to request and/or receive sensitive information. Authorized entities may include any suitable entities (e.g., people, organizations, software agents, etc.) that are authorized to receive sensitive information from security device 100, including, without limitation, payment services providers (PSPs) and/or trusted users (e.g., account managers, customer service agents, application administrators, security team members, and/or other users who are authorized to handle sensitive information). In some embodiments, a subscriber may be authorized to request and/or receive sensitive information provided by and/or corresponding to that subscriber. The contact information may include information suitable for contacting each of the authorized entities, including, without limitation, information identifying the authorized entity, information identifying a communication protocol to be used when communicating with the authorized entity, information identifying an address to which sensitive information intended for the authorized entity may be sent, an encryption protocol for encrypting sensitive information before sending the sensitive information to the authorized entity, and/or a public key for encrypting sensitive information before sending the sensitive information to the authorized entity. The address associated with an authorized entity may include, without limitation, an email address, a file-transfer protocol (FTP) address, a hypertext transfer protocol (HTTP) address, an internet protocol (IP) address, a user data protocol (UDP) address, a media access control (MAC) address, and/or any other suitable address to which data can be sent. When authorized to send sensitive information to an authorized entity, security device 100 may use the contact information to determine where the information should be sent and how the information should be encrypted. In some embodiments, the contact information may be entered into security device 100 by a user with physical access to the security device, transferred to security device 100 from a remotely located computing device by a suitably authenticated user, and/or stored on security device 100 in a device configuration file.

In some embodiments, security device 100 may send encrypted sensitive information to an authorized entity in response to receiving suitable instructions to send the sensitive information to the authorized entity. For example, in response to receiving instructions from a payment services subscriber to use a PSP to execute a payment, security device 100 may access contact information to confirm that the PSP is an authorized recipient of sensitive information, obtain the subscriber's sensitive information (e.g., financial, account, and/or authentication information suitable for authorizing the PSP to execute the payment), decrypt the sensitive information using the appropriate private key, re-encrypt the sensitive information using a public key corresponding to the PSP, and send the re-encrypted information to the PSP (e.g., to an address at which the PSP receives sensitive information, such as an address included in the security device's contact information for the PSP). As another example, in response to receiving instructions from an entity to divulge a subscriber's sensitive information (e.g., for purposes of complying with a court order), security device 100 may access contact information to confirm that the entity is an authorized entity, obtain the subscriber's sensitive information (e.g., all the available sensitive information for the subscriber, or particular types of sensitive information identified in the authorized entity's instructions), decrypt the sensitive information using the appropriate private key, re-encrypt the sensitive information using a public key corresponding to the authorized entity, and/or send the re-encrypted information to the authorized entity (e.g., to an address at which the authorized entity receives sensitive information, such as an address included in the security device's contact information for the authorized entity).

The sensitive information sent by security device 100 may be encoded using any suitable technique. In some embodiments, security device 100 may encode the sensitive information in human-readable form, including, without limitation, the form of a written human language. For example, security device 100 may encode the sensitive information in human-readable form in an image file and/or in a portable document format (PDF) file, such that the sensitive information is visible in human-readable form to a user who views the contents of the file. Security device 100 may encrypt the file containing the sensitive information before sending the file to an authorized entity, as described above. In some embodiments, security device 100 may encode the sensitive information in computer-readable form. For example, security device 100 may encode the sensitive information in computer-readable form in a file and encrypt the file, or may encrypt the computer-readable sensitive information and encode the encrypted data in a file. The file may then be sent to an authorized entity.

In some embodiments, the information sent to an authorized entity by security device 100 may include sensitive information and/or other information. The "other information" may include, without limitation, information identifying an entity (e.g., subscriber, PSP, or trusted user) that requested divulgation of the corresponding sensitive information, and/or an account (e.g., a subscriber account, trusted user account, or PSP account) used to request divulgation of the corresponding sensitive information. Such information may be useful for detecting and preventing attempted theft of sensitive information (e.g., by unauthorized entities impersonating authorized entities).

In some embodiments, security device 100 may limit the amount of sensitive information divulged in response to an individual request. For example, security device 100 may limit the maximum number of bytes of sensitive information divulged in response to an individual request, and/or may limit the maximum number of subscribers whose sensitive information may be divulged in response to an individual request. The maximum number of subscribers whose sensitive information may be divulged in response to an individual request may be 1, 2, 5, 10, or more than 10. Increasing the number of requests and responses required to obtain some amount of sensitive information may increase the likelihood of detecting a security breach before a large amount of sensitive information is divulged, even in encrypted form.

In some embodiments, security device 100 may limit the amount of sensitive information divulged in an individual response to a request, while still allowing an authorized entity to request large amounts of sensitive information using an individual request. For example, security device 100 may limit the maximum number of bytes of sensitive information divulged in an individual response, and/or may limit the maximum number of subscribers whose sensitive information may be divulged in an individual response. The maximum number of subscribers whose sensitive information may be divulged in an individual response may be 1, 2, 5, 10, or more than 10. Increasing the number of responses required to obtain some amount of sensitive information, while allowing an authorized entity to request large amounts of sensitive information using an individual request, may increase the likelihood of detecting a security breach before a large amount of sensitive information is divulged, even in encrypted form, while also providing a user-friendly interface for authorized entities.

In some embodiments, security device 100 may never transmit or export unencrypted sensitive information outside the security device's own hardware. In some embodiments, unencrypted sensitive information may be temporarily stored in a memory of security device 100 for legitimate purposes. In some embodiments, unencrypted sensitive information stored in the security device's memory may be overwritten or otherwise destroyed after the security device uses the information for a legitimate purpose (e.g., after the security device generates encrypted data including the sensitive information).

Some embodiments of security device 100 may communicate over two or more communication channels. In the example of FIG. 1, security device 100 is communicatively coupled to a first channel 102 and a second channel 104, over which security device 100 may communicate. In some embodiments, first channel 102 may be used primarily to carry incoming data to security device 100. Such incoming data may include, without limitation, unencrypted sensitive information, encrypted data comprising sensitive information, and/or requests to divulge sensitive information. However, first channel 102 is not necessarily a unidirectional channel. In some embodiments, first channel 102 may be a bidirectional channel and may carry some outgoing communication from security device 100, including, without limitation, flow-control communication and/or communication acknowledging receipt of data. In some embodiments, security device 100 may store encrypted data including sensitive information, and a request to divulge sensitive information may be accompanied by data identifying the encrypted data that includes the desired sensitive information. In some embodiments, security device 100 may not store encrypted data including sensitive information, and a request to divulge sensitive information may be accompanied by the encrypted data that includes the desired sensitive information.

In some embodiments, second channel 104 may be used primarily to carry outgoing communication away from security device 100. Such outgoing information may include, without limitation, encrypted data including sensitive information (e.g., data that has been encrypted using a public key corresponding to an authorized entity to which the sensitive information is being sent), and/or address data corresponding to an authorized entity to which the sensitive information is being sent. However, second channel 104 is not necessarily a unidirectional channel. In some embodiments, second channel 104 may be a bidirectional channel and may carry some incoming communication to security device 100, including, without limitation, flow-control communication and/or communication acknowledging receipt of data.

The use of separate channels by security device 100 to receive requests to divulge sensitive information and to send encrypted sensitive information in response to such requests may, in some embodiments, make it more difficult for unauthorized entities to obtain sensitive information. If an unauthorized entity gains access to the account of an authorized entity and requests sensitive information, the sensitive information will not be sent in unencrypted form and will not necessarily be sent to the computing device from which the unauthorized entity sent the request. Rather, the sensitive information will be sent in encrypted form to the registered address associated with the account of the authorized entity. Thus, for the unauthorized entity to actually access the requested sensitive information, the unauthorized entity needs to also gain access to the address where the encrypted data is sent, and to the authorized entity's private key. Gaining access to the authorized user's account, registered address, and private key may be significantly more difficult than gaining access to only the authorized user's account.

Security device 100 may be hardened. In some embodiments, security device 100 may be protected by one or more firewalls, one or more intrusion-prevention services, and/or one or more intrusion-detection services. In some embodiments, security device 100 may be disposed in a physically secure location, including, without limitation, an area where physical access is limited to a small number of trusted people.

Security device 100 may have a small perimeter of use. The security device's perimeter of use may refer to any software, users, accounts, and/or networks with access to the physical memory in which security device 100 stores unencrypted sensitive information. In some embodiments, the software installed on security device 100 may be limited to the software required to perform the above-described decryption, encryption, and communication tasks. Some or all of the software installed on security device 200 may be referred to as "decryption middleware."

Figure 2:
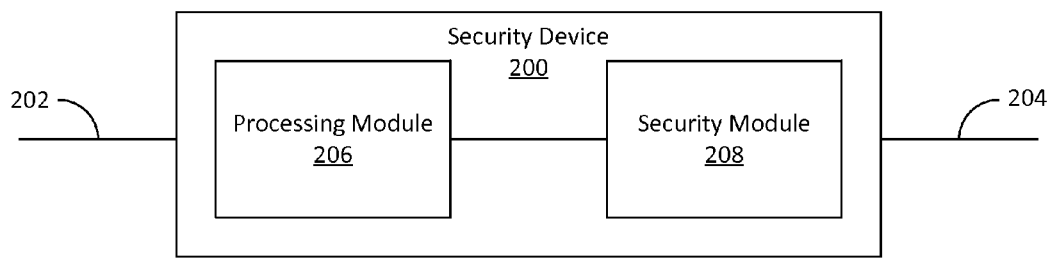
FIG. 2 is a block diagram of an implementation of security device 200, according to some embodiments.
Figure 6:
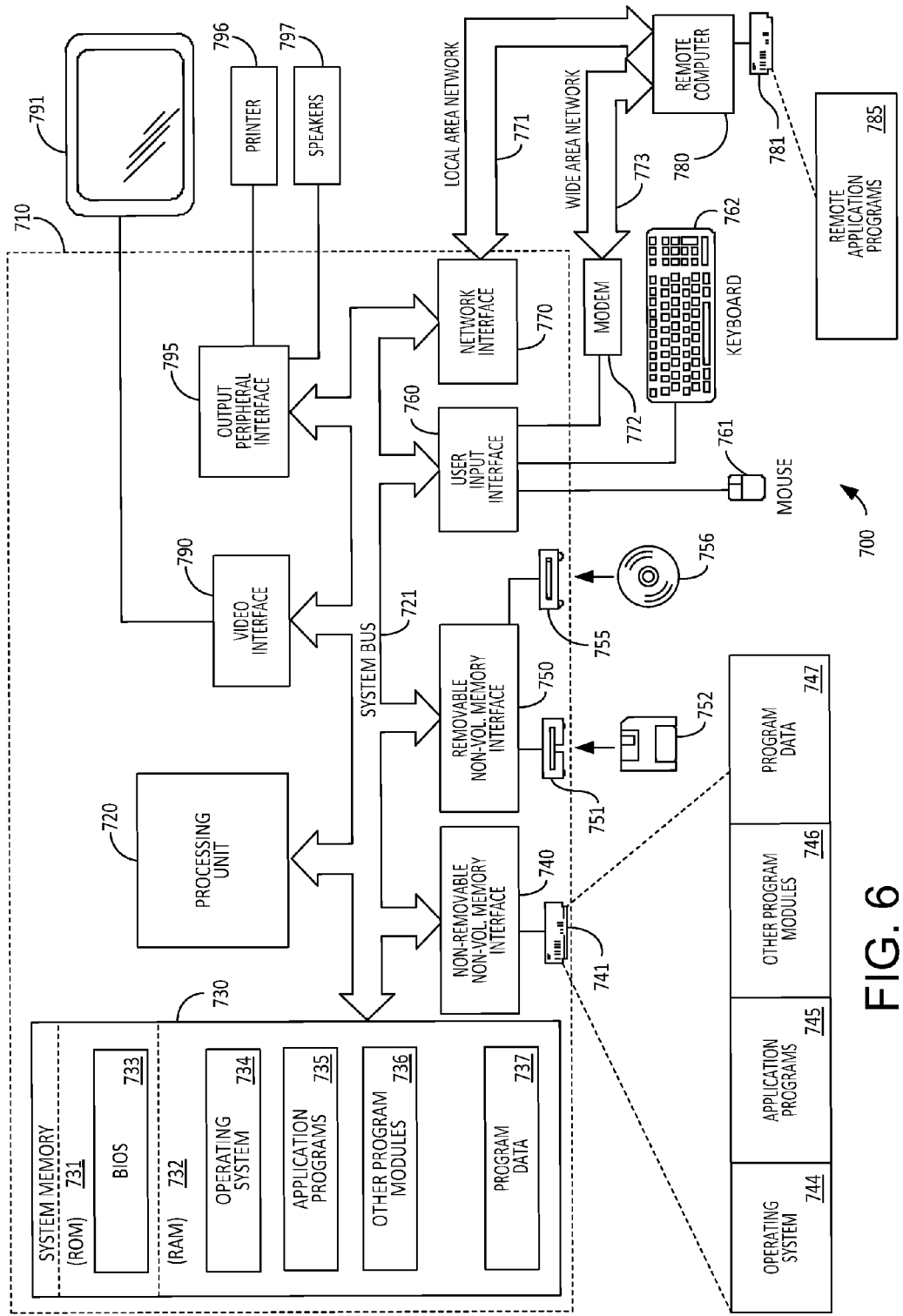
FIG. 6 is a block diagram of an exemplary computer system 700 in which aspects of the present disclosure may be implemented, according to some embodiments.

FIG. 2 shows a block diagram of an implementation of a security device 200, according to some embodiments. As shown in FIG. 2, security device 200 may be implemented using a processing module 206 and a security module 208, and may be configured to communicate using a first channel 202 and a second channel 204. A non-limiting example of a computer system 700 in which embodiments of processing module 206 may be implemented is shown in FIG. 6 and discussed below.

In some embodiments, security module 208 may store cryptographic keys (e.g., private and/or public keys) and may use the keys to perform decryption and/or encryption of sensitive information. In some embodiments, security module 208 may implement asymmetric cryptography using any suitable cryptographic technique, including, without limitation, RSA encryption, ElGamal encryption, DSS encryption, Paillier encryption, Cramer-Shoup encryption, and/or YAK encryption. In some embodiments, security module 208 may generate and store one or more private keys, such that the private keys are never stored outside security module 208. In some embodiments, security module 208 may generate one or more public keys corresponding to a private key and export the public keys for use by software configured to send encrypted information to security device 200. In some embodiments, security module 208 may respond to detection of a security breach and/or attempted security breach of security device 200 and/or security module 208 by destroying the keys (e.g., private keys) stored in security module 208.

In some embodiments, security module 208 may include a hardware security module (HSM) (e.g., an HSM provided by SafeNet, Inc.), which may be communicatively coupled to processing module 206. In some embodiments, security module 208 may be internally installed in processing module 206. In some embodiments, security module 208 may be external to processing module 206.

Although embodiments have been described in which a security device is implemented using a processing module 206 and a security module 208, embodiments are not limited in this regard, and a security device may be implemented using any suitable technique. In some embodiments, a security device may be implemented using a processing module and without using a separate security module.

Figure 3:
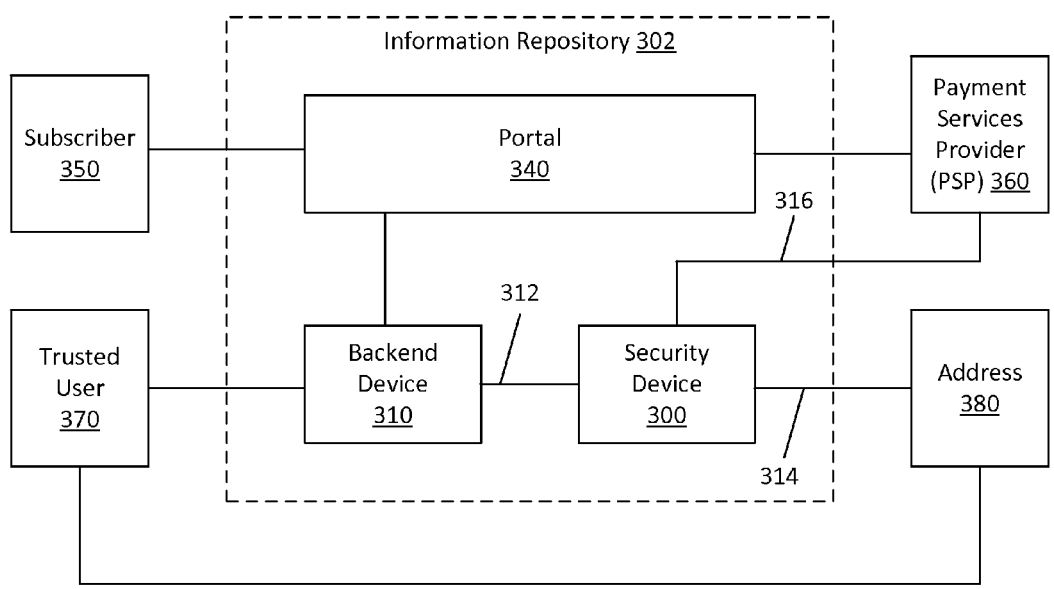
FIG. 3 is a block diagram of an information repository 302, according to some embodiments.

FIG. 3 shows a block diagram of an information repository 302, according to some embodiments. In some embodiments, information repository 302 may include a portal 340, a backend device 310, and a security device 300. In some embodiments, information repository 302 may implement a network service for storing and processing sensitive information (e.g., a password management service, a payment processing service, and/or a service for managing payment services between an integrated host wallet system and PSPs). Subscribers to the service may provide sensitive information to information repository 302 for storage therein. In some embodiments, a subscriber may authorize an operator of information repository 302 to divulge the subscriber's sensitive information under certain circumstances (e.g., to a payment services provider for purposes of making a payment, or to an authentication application for purposes of authenticating the subscriber).

In some embodiments, information repository 302 may receive sensitive information through a portal 340. The sensitive information may be provided, for example, by subscribers 350 and/or by PSPs 360. In some embodiments, information repository 302 may store the sensitive information in an encrypted form (e.g., in backend device 310 and/or in security device 300). In some embodiments, information repository 302 may receive requests to divulge sensitive information from subscribers 350, PSPs 360, and/or trusted users 370. Such requests may be received, for example, through portal 340 and/or through backend device 310. In some embodiments, information repository 302 may respond to legitimate divulgation requests by divulging sensitive information to authorized entities through security device 300.

In some embodiments, portal 340 may implement an interface through which users of information repository 302 (e.g., subscribers 350 and/or PSPs 360) may access the repository. In some embodiments, repository users may send sensitive information to information repository 302 through portal 340. The sensitive information may be sent by the repository user from any suitable computing device, including, without limitation, a desktop computer, laptop computer, tablet, smartphone, and/or wearable computing device. In some embodiments, the repository user's computing device may encrypt the sensitive information before sending it to portal 340, using any suitable encryption technique (e.g., SSL encryption).

In response to receiving sensitive information from a repository user, portal 340 may encrypt the sensitive information and forward the encrypted information to backend device 310. In some embodiments, portal 340 may store one or more public keys corresponding to a private key held by security device 300. In some embodiments, portal 340 may use the one or more public keys to asymmetrically encrypt the sensitive information before forwarding the encrypted information to backend device 310.

Portal 340 may obtain the public key(s) using any suitable technique. In some embodiments, the public key(s) may be generated by security device 300 and forwarded to portal 340 (e.g., through backend device 310). In some embodiments, the public key(s) may be replaced from time to time (e.g., periodically, intermittently, and/or in response to certain events, such as detection of an actual or suspected security breach). In some embodiments, the public key(s) may be replaced when security device 300 generates a new private key for encrypted communication between portal 340 and backend device 310. Security device 300 may be configured to generate a new private key from time to time (e.g., periodically, intermittently, and/or in response to certain events, such as detection of an actual or suspected security breach).

In some embodiments, if the portal receives the sensitive information from a repository user in encrypted form, the portal may decrypt the received data to extract the unencrypted sensitive information before using the portal's public key to encrypt the sensitive information. However, handling of decrypted sensitive information by portal 340 may create a risk that the sensitive information could be stolen by scraping memory devices used by portal 340. Thus, in some embodiments, if the portal receives the sensitive information from the repository user in a first encrypted form, the portal may not decrypt the received data before using the portal's public key to apply a second encryption to the already-encrypted sensitive information. The first layer of encryption may then be removed by backend device 310 or, preferably, by security device 300.

In some embodiments, registry users may send requests for non-sensitive information to information repository 302 through portal 340. In some embodiments, information repository 302 may respond to such requests by sending the requested non-sensitive information to the registry user through backend device 310 and portal 340.

In some embodiments, portal 340 may be implemented using one or more web servers executing on one or more computer systems. Any suitable computer system may be used (e.g., a computer system 700 as described below).

Backend device 310 may implement one or more non-cryptographic functions of information repository 302, including, without limitation, business functions, registry user authentication, fraud prevention, and/or storage of registry user data. In some embodiments, backend device 310 may communicate with registry users through portal 340. Some embodiments of backend device 310 may receive data sent by registry users to information repository 302 through portal 340, including, without limitation sensitive information, non-sensitive information, instructions to execute payment, requests to divulge sensitive information, and/or requests for non-sensitive information. Some embodiments of backend device 310 may send data to registry users through portal 340, including, without limitation, non-sensitive information (e.g., in response to requests for non-sensitive information).

In some embodiments, backend device 310 may communicate with portal 340. Some embodiments of backend device 310 may send public keys to portal 340, to be used by portal 340 to encrypt sensitive information before sending the sensitive information to the backend device.

In some embodiments, backend device 310 may communicate with trusted users 370 through a backend interface (e.g., a GUI accessible to trusted users over a secure network, such as virtual private network (VPN)). Some embodiments of the backend interface may be used to authenticate users who attempt to access information repository 302 through backend device 310 (e.g., by logging on to backend device 310). In some embodiments, trusted users 370 who are authenticated by backend device 310 may send requests for divulgation of sensitive information to information repository 302 through backend device 310.

In some embodiments, backend device 310 may store encrypted data including sensitive information. The encrypted data may, for example, be stored on a storage device and/or in a database.

In some embodiments, backend device 310 may forward requests to divulge sensitive information (e.g., requests received from trusted users, subscribers, PSPs, and/or any authorized entity) to security device 300. In connection with forwarding a divulgation request to security device 300, backend device 310 may forward information identifying the authorized entity that requested the divulgation of the sensitive information. For security purposes, security device 300 may include the information identifying the authorized entity that made the request in the data sent to the registered address corresponding to the authorized entity. In some embodiments, backend device 310 may forward encrypted data comprising sensitive information to security device 300 for decryption processing (e.g., in connection with forwarding a request to divulge the sensitive information, and/or in response to security device 300 requesting the encrypted data).

In some embodiments, backend device 310 may maintain an audit record of requests to divulge sensitive information and/or responses to those requests. For a divulgation request, the audit record may store the time of the request, information identifying the account used to send the request and/or the authorized entity to which the account is assigned, information identifying the sensitive information for which divulgation was requested, information identifying the computing device that sent the divulgation request (e.g., IP address, MAC address, etc.) and/or any other information suitable for auditing divulgation requests. For a divulgation response, the audit record may store the time of the response, information identifying the divulged sensitive information, the address to which the sensitive information was sent, and/or any other information suitable for auditing divulgation responses.

In some embodiments, backend device 310 may alert one or more trusted users to potentially unauthorized divulgations of sensitive information. Backend device 310 may alert a trusted user to the potential security breach by emailing the trusted user, by sending a voicemail to the trusted user, by disabling network access to backend device 310 and/or information repository 302, by producing an audible alarm sound, and/or by any other suitable technique. In some embodiments, backend device 310 may issue such an alert when a request to divulge sensitive information is received, when a response divulging sensitive information is sent, when an entry is made in the audit record, when the number or rate of requests for divulgation of sensitive information exceed a threshold number or rate, when the number or rate of responses divulging sensitive information exceeds a threshold number or rate, when the amount or rate of sensitive information divulged exceeds a threshold amount or rate, and/or in response to any suitable event.

In some embodiments, backend device 310 may be configured to never process or store (even temporarily) unencrypted sensitive information. In some embodiments, backend device 310 may be configured with no interface for displaying or sending unencrypted sensitive information to any user.

Backend device 310 may be implemented on one or more computer systems. Any suitable computer system may be used (e.g., a computer system 700 as described below).

In some embodiments, security device 300 may receive requests to divulge sensitive information over a portion 312 of a first channel. The first channel may include backend device 310. In some embodiments, security device 300 may respond to a request to divulge sensitive information to an authorized entity by obtaining the encrypted data containing the sensitive information (e.g., from backend device 310), decrypting the encrypted data (e.g., using the private key corresponding to the public key(s) held by portal 340), re-encrypting the sensitive information (e.g., using a public key corresponding to the authorized entity to which the sensitive information is being divulged), and sending the re-encrypted data to the authorized entity through a second channel, different from the first channel. In some embodiments, the second channel may not include backend device 310. In some embodiments, security device 300 may send the encrypted sensitive information over a second channel 314 to a registered address 380 corresponding to the authorized entity. In some embodiments, security device 300 may send the encrypted sensitive information over a third channel 316 (e.g., a VPN connection) to the authorized entity.

Some embodiments of security device 300 have been described above. For brevity, the foregoing description of embodiments of security device 300 is not repeated here.

Although the illustration of FIG. 3 shows security device 300 sending encrypted sensitive information to trusted user 370 through a registered address 380 corresponding to trusted user 370, and sending encrypted sensitive information to a device of PSP 360 (e.g., using a VPN), embodiments are not limited in this respect. In some embodiments, encrypted sensitive information may be sent to any authorized entity using a registered address and/or a VPN.

In some embodiments, trusted users 370 may log into backend device 310 and/or request divulgation of sensitive information through the backend device's backend interface. In some embodiments, an asymmetric encryption key pair (e.g., a public key and a private key) may be generated for each trusted user or group of trusted users. The private key(s) may be distributed to the trusted users, who may use the private key(s) to decrypt sensitive information divulged by information repository 302. The corresponding public keys may be forwarded to information repository 302 (e.g., through backend device 310) and stored on security device 300, which may use a public key to encrypt sensitive information before sending the encrypted sensitive information to the corresponding trusted user. In some embodiments, trusted users may generate their own key pairs and send the public keys to information repository 302. In some embodiments, a separate device may generate the key pairs and either send the key pairs to the trusted users, or send the private keys to the trusted users and send the public keys to information repository 302.

Trusted user 370 may store its private key in any suitable storage device. In some embodiments, a trusted user's private key may be stored in a storage medium of a computing device, making the private key easily accessible for decrypting sensitive information obtained by the computing device. In some embodiments, a trusted user's private key may be stored in a portable, detachable storage device, including, without limitation, a memory card, an SD card, a microSD card, a miniSD card, a flash drive, a compact flash card, a memory stick, a thumb drive, a USB flash drive, and/or any other suitable storage device. Storing the private key on a separate storage device may enhance security by making it more difficult for unauthorized entities to obtain an authorized entity's private key.

In some embodiments, a trusted user's private key may be stored in a cryptographic token. A cryptographic token may be a physical device which includes a storage medium for storing a private key and a processor configured (e.g., programmed) to use the private key to decrypt information (e.g., sensitive information). The cryptographic token may be implemented using a smart card, a USB token, and smart-card-based USB token, and/or any other suitable token.

A trusted user may use any suitable computing device to communicate with information repository 302, including, without limitation, a computer system 700 as described below.

Some benefits of some embodiments described in the present disclosure may be illustrated by the following two non-limiting examples. According to some techniques, an entity that is authorized to request divulgation of sensitive information (e.g., for purposes of complying with a court order) from an information system may be permitted to log into the system and request the desired sensitive information. The sensitive information may then be sent to the entity in unencrypted form. For example, the unencrypted sensitive information may be displayed to the entity through a system interface, or may be sent to the computing device from which the entity sent the request for the sensitive information. In this scenario, an unauthorized entity may gain unlimited access to unencrypted sensitive information simply by gaining access to an authorized entity's account with the information system (e.g., by obtaining the authorized entity's username and password).

By contrast, in some embodiments described in the present disclosure, an entity that is authorized to request divulgation of sensitive information may be permitted to log into an information repository and request the desired sensitive information, but the sensitive information may be sent, in encrypted form, to a registered address corresponding to the entity, using a channel that differs from the channel through which the authorized entity requested the sensitive information. In this scenario, an unauthorized entity may able to obtain a desired piece of unencrypted sensitive information by gaining access to an authorized entity's account with the information repository, gaining access to a second account through which the authorized entity accesses data sent to the registered address, and gaining access to the authorized entity's private key.

Figure 4:
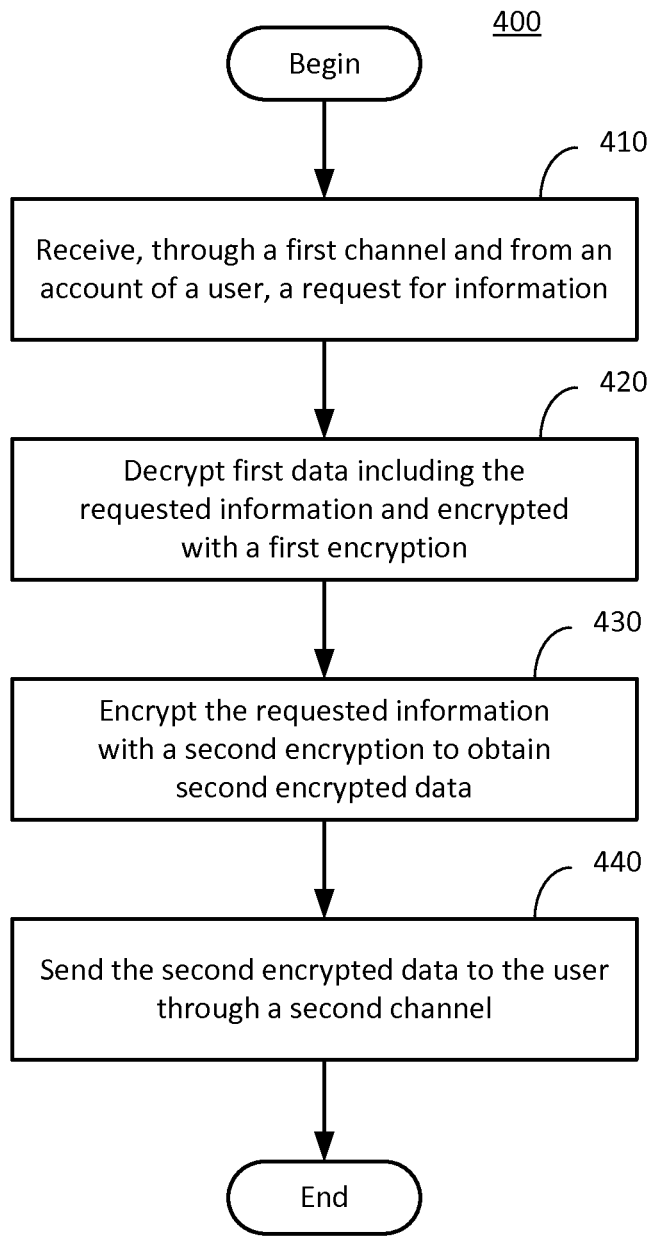
FIG. 4 is a flowchart of a method 400 for controlling disclosure of information, according to some embodiments.

FIG. 4 shows a method 400 for controlling disclosure of information, according to some embodiments. In step 410 of method 400, a request for information is received through a first communication channel. The requested information may comprise sensitive information. In some embodiments, the request may explicitly identify an authorized entity to which the information should be sent. In some embodiments, the request may be sent using an account of an authorized entity, and the request may be interpreted as requesting that the information be sent to that same authorized entity. In some embodiments, the requested information may comprise sensitive information of one or more entities other than the authorized entity requesting the sensitive information and/or other than the authorized entity to which the sensitive information is to be sent.

In some embodiments, the first communication channel may comprise a logical communication channel between a security device and a computing device of an authorized entity. In some embodiments, the logical communication channel may include a backend device.

In some embodiments, the request for information may include a description of the requested information. The description of the requested information may include information identifying one or more subscribers associated with the requested information (e.g., one or more subscribers to whom portions of the requested information belong), one or more types of requested information (e.g., financial information, debit and/or credit card information, authentication information, and/or medical information), one or more dates, times, and/or identifiers associated with the requested information, and/or any other information suitable for identifying the requested information.

In some embodiments, method 400 may include an address selection step not shown in FIG. 4. In the address selection step, an address may be selected. In some embodiments, the address may be a registered address corresponding to the authorized entity to which the information is to be sent. In some embodiments, the address may be determined by looking up an entry corresponding to the authorized entity in a data structure that correlates authorized entities with registered addresses (e.g., an entry corresponding to the authorized entity's account), and by selecting the address that corresponds to the authorized entity. In some embodiments, the address may comprise an email address.

In step 420 of method 400, first encrypted data including at least a portion of the requested information may be decrypted. In some embodiments, the first encrypted data may be received with or in connection with the request for information. In some embodiments, the first encrypted data may be identified based on the request's description of the requested information, and obtained from a storage medium.

In some embodiments, the decryption may be performed by a security module (e.g., a hardware security module). In some embodiments, the first encrypted data may have been encrypted with a first encryption (e.g., a first encryption protocol and/or a first public encryption key). In some embodiments, the first encrypted data may be decrypted using a private key and a decryption protocol corresponding to a public key and encryption protocol with which the first encrypted data were encrypted. In some embodiments, the private key may be stored in the security module.

In some embodiments, less than all of the requested information may be decrypted. In some embodiments, the information decrypted in response to a divulgation request may be limited to sensitive information of no more than N users, where N is an integer. In some embodiments, N may be 1, 2, 5, 10, or more than 10.

In step 430 of method 400, the decrypted, requested information may be encrypted with a second encryption to obtain second encrypted data. In some embodiments, the second encryption may be different from the first encryption (e.g., the second encryption may be performed using a second encryption protocol different from the first encryption protocol, and/or using a second public encryption key different from the first public encryption key). In some embodiments, the second public encryption key may correspond to the authorized entity to which the requested information is to be sent, or to a group of authorized entities which includes the intended recipient of the requested information. In some embodiments, the second encryption key may be determined by looking up an entry corresponding to the authorized entity in a data structure that correlates authorized entities with public encryption keys (e.g., an entry corresponding to the authorized entity's account), and by selecting the public encryption key that corresponds to the authorized entity.

In some embodiments, the encryption may be performed by a security module (e.g., a hardware security module). In some embodiments, the second public encryption key may be stored in the security module.

In some embodiments, the second encryption may be performed on a computer-readable representation of the decrypted requested information. In some embodiments, the decrypted requested information may be added to a file in human-readable form (e.g., as text in a document, such as a PDF document, or as a portion of an image file), and the second encryption may be performed on the file.

In step 440 of method 400, the second encrypted data (which includes at least a portion of the requested information) may be sent to an authorized entity (e.g., to the authorized entity which requested the information, or to an authorized entity identified as the recipient of the requested information in the divulgation request). In some embodiments, the second encrypted data may be sent using a second channel different from the first channel through which the divulgation request was received. In some embodiments, the second channel may comprise a logical communication channel between a security device and a device configured to receive data sent to the selected address. In some embodiments, the second encrypted data may not be sent to the backend device.

In some embodiments, sending the second encrypted data to the authorized entity may comprise sending the second encrypted data to the address corresponding to the authorized entity. In some embodiments, the address may be an email address, and sending the second encrypted data to the email address may comprise generating an email, attaching the second encrypted data to the email, and sending the email to the email address.

In some embodiments, method 400 may include an authentication step not shown in FIG. 4. In the authentication step, an authorized entity may be authenticated based on one or more authentication factors provided by the authorized entity. Any suitable authentication technique may be used, including, without limitation, single-factor authentication (e.g., authentication based on a username and password), two-factor authentication, and/or three-factor authentication. In some embodiments, an entity that has not been authenticated may not be permitted to submit requests for information. In some embodiments, requests for information submitted by non-authenticated entities may be ignored or denied.

In some embodiments, method 400 may include a permissions enforcement step, not shown in FIG. 4. In the permissions enforcement step, a determination may be made as to whether the authorized entity requesting a piece of information (or the authorized entity identified as the intended recipient of the piece of information) has permission to view that piece of information. In some embodiments, the permissions enforcement step may be repeated for all pieces of information for which divulgation is requested, or for all pieces of sensitive information for which divulgation is requested. In some embodiments, if the requesting entity or intended recipient entity does not have permission to view a requested piece of information, the requested piece of information may be omitted from the response to the divulgation request, or the divulgation request may be denied in its entirety.

In some embodiments, method 400 may include a payment processing step, not shown in FIG. 4. In the payment processing step, there may be received, through a third communication channel, instructions to send sensitive information to a payment services provider (PSP). In some embodiments, encrypted data comprising the sensitive information may be decrypted. In some embodiments, the decrypted sensitive information may be encrypted with a third encryption technique different from the first and second encryption techniques to obtain third encrypted data. The third encryption technique may use a third encryption protocol and/or a third encryption key different from the encryption protocols and/or encryption keys of the first and second encryption techniques. In some embodiments, the third encrypted data comprising the requested information may be sent to a payment services provider through a third communication channel different from the first and second communication channels.

Figure 5:
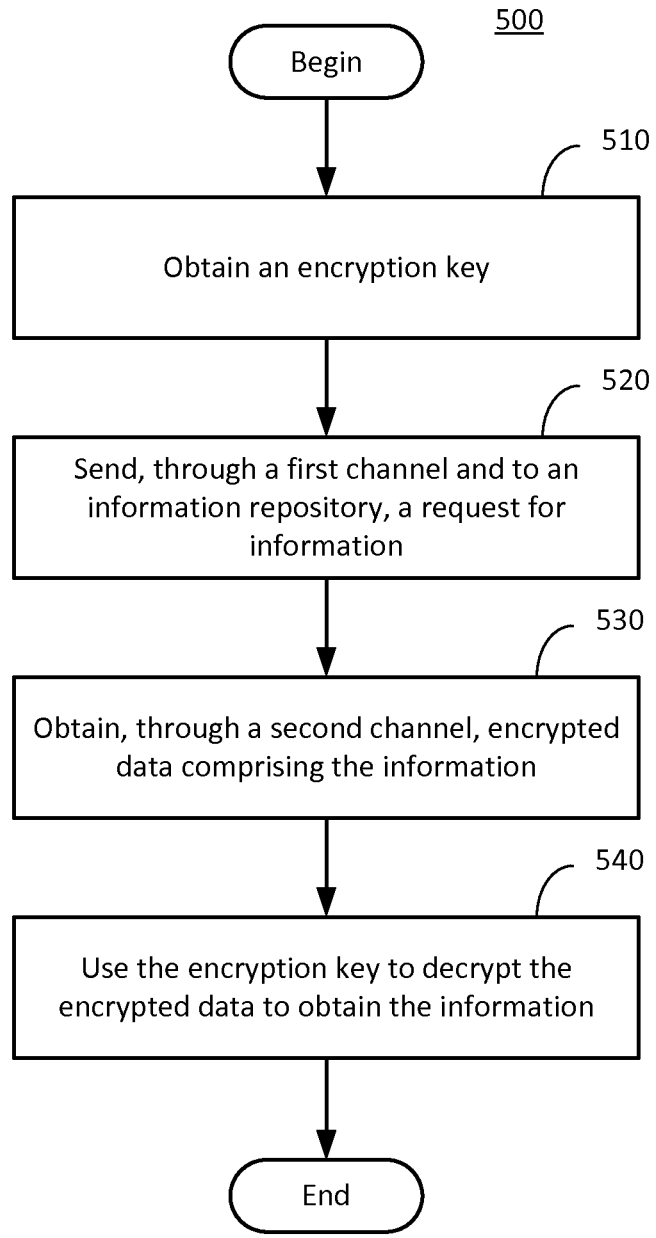
FIG. 5 is a flowchart of a method 500 for obtaining information, according to some embodiments.

FIG. 5 shows a method 500 for obtaining information, according to some embodiments. In some embodiments, method 500 may be performed by a computing device of an authorized entity, which may be in communication with an information repository. In step 510, a decryption key (e.g., a private key) may be obtained. In some embodiments, the decryption key may be received by the authorized entity's computing device. In some embodiments, the decryption key may be generated by the authorized entity's computing device. In some embodiments, an encryption key (e.g., public key) corresponding to the decryption key may also be obtained, and may be sent to the information repository.

In step 520, a request for information may be sent to an information repository. In some embodiments, at least a portion of the requested information may be sensitive information. In some embodiments, the request may be sent through a first channel. In some embodiments, the first channel may comprise a logical communication channel portion between the authorized entity's computing device and a backend device of the information repository.

In step 530, encrypted data comprising the requested information may be received. In some embodiments, the encrypted data may be received through a second channel, different from the first channel. In some embodiments, the second channel may comprise a logical communication channel between the authorized entity's computing device and a computing device which stores data sent to an address corresponding to the authorized entity.

In some embodiments, the encrypted data may be decrypted using the decryption key obtained in step 510. After decrypting the encrypted data, the information requested in step 520 may be accessed in an unencrypted form.

Some embodiments have been described in which encrypted sensitive information is sent by a security device 300 to a registered address 380 associated with an authorized entity. In some embodiments, the sensitive information may be encrypted using an asymmetric encryption, as described above. In some embodiments, the sensitive information may be encrypted using a symmetric encryption (e.g., a fully symmetric encryption).

FIG. 6 shows a block diagram of a computer system 700 in which aspects of the present disclosure may be implemented, according to some embodiments. This computing system may be representative of a computing system suitable for implementing the described techniques. However, it should be appreciated that computer system 700 is only one example of a suitable computing environment and is not intended to suggest any limitation as to the scope of use or functionality of the described embodiments. Neither should computer system 700 be interpreted as having any dependency or requirement relating to any one or combination of components illustrated in FIG. 6.

The embodiments are operational with numerous other general purpose or special purpose computing system environments or configurations. Examples of well-known computing systems, environments, and/or configurations that may be suitable for use with the described techniques include, but are not limited to, personal computers, server computers, hand-held or laptop devices, smart phones, wearable computers, multiprocessor systems, microprocessor-based systems, set top boxes, programmable consumer electronics, network PCs, minicomputers, mainframe computers, distributed computing environments that include any of the above systems or devices, and the like.

The computer system may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system 700 for implementing the described techniques includes a general purpose computing device in the form of a computer 710.

Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, solid state drives, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 6 illustrates operating system 734, application programs 735, other program modules 736, and program data 737.

The computer 710 may also include other removable/non-removable, volatile/nonvolatile computer storage media. By way of example only, FIG. 6 illustrates a hard disk drive 741 that reads from and/or writes to non-removable, nonvolatile magnetic media, a magnetic disk drive 751 that reads from and/or writes to a removable, nonvolatile magnetic disk 752, and an optical disk drive 755 that reads from and/or writes to a removable, nonvolatile optical disk 756 such as a CD ROM or other optical media. Other removable/non-removable, volatile/nonvolatile computer storage media that can be used in the exemplary computer system include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 6 provide storage of computer readable instructions, data structures, program modules and other data for the computer 710. In FIG. 6, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, touchscreen, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 6. The logical connections depicted in FIG. 6 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 6 illustrates remote application programs 785 as residing on memory device 781. It will be appreciated that the network connections shown are exemplary and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory processor-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

The terminology "received from" and variants thereof is used herein to describe both indirect and direct communication between a sender and a receiver. For example, "device X received data from device Y" may be used to describe the scenario in which device Y sends data directly to device X, without the data being received and retransmitted by any intermediate devices, and may also be used to describe the scenario in which device Y sends data addressed to device X, with the data being received and retransmitted by one or more intermediate devices before reaching device X.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An apparatus comprising:
   at least one processing circuit; and
   at least one storage medium storing instructions that, when executed by the at least one processing circuit, cause the apparatus to perform steps including:
   receiving, through a first communication channel, a request for information, the request provided using an account of a user;
   decrypting first encrypted data comprising at least a portion of the requested information, the first encrypted data being encrypted with a first asymmetric encryption key;
   encrypting the at least a portion of the requested information with a second asymmetric encryption key different from the first asymmetric encryption key to obtain second encrypted data comprising the at least a portion of the requested information;
   sending the second encrypted data comprising the at least a portion of the requested information to the user through a second communication channel different from the first communication channel;
   receiving, through a third communication channel that is different from the first and second communication channels from a payment services provider (PSP), instructions to send the at least a portion of the requested information to the PSP, the at least a portion of the requested information corresponding to information requested using the account of the user;
   decrypting the first encrypted data comprising the at least a portion of the requested information corresponding to information requested using the account of the user;
   encrypting the at least a portion of the requested information with a third asymmetric encryption key different from the first and second asymmetric encryption keys to obtain third encrypted data comprising the at least a portion of the requested information, the at least a portion of the requested information corresponding to information requested using the account of the user; and
   sending the third encrypted data comprising the at least a portion of the requested information to the PSP through the third communication channel.

2. The apparatus of claim 1, wherein the user is a first user, and wherein the requested information comprises authentication information and/or financial account information of one or more second users.

3. The apparatus of claim 2, wherein the requested information comprises authentication information and/or account information of two or more of the second users, and wherein the at least a portion of the requested information comprises the authentication information and/or account information of fewer than all of the two or more second users.

4. The apparatus of claim 3, wherein the at least a portion of the requested information comprises the authentication information and/or account information of a single one of the second users.

5. The apparatus of claim 1, further comprising a security module configured to encrypt information with the second asymmetric encryption key, wherein encrypting the at least a portion of the requested information with the second asymmetric encryption key comprises using the security module to encrypt the at least a portion of the requested information with the second asymmetric encryption key.

6. The apparatus of claim 5, wherein the security module is further configured to decrypt data encrypted with the first asymmetric encryption key, and wherein decrypting the first encrypted data encrypted with the first asymmetric encryption key comprises using the security module to decrypt the first encrypted data encrypted with the first asymmetric encryption key.

7. The apparatus of claim 6, wherein the security module comprises a hardware security module, and wherein the hardware security module includes at least one storage medium storing a decryption key corresponding to the first asymmetric encryption key and storing the second asymmetric encryption key.

8. The apparatus of claim 5, wherein encrypting the at least a portion of the requested information with the second asymmetric encryption key comprises using the security module to encrypt a file with the second asymmetric encryption key, wherein the file includes the at least a portion of the requested information in a human-readable format.

9. The apparatus of claim 8, wherein the file comprises a portable document format (PDF) file.

10. The apparatus of claim 1, wherein the steps further include selecting an address based, at least in part, on the user account used to provide the request for the information, and wherein sending the second encrypted data to the user through the second communication channel comprises sending the second encrypted data to the selected address through the second communication channel.

11. The apparatus of claim 10, wherein the address comprises an email address, wherein the steps further include generating an email including and/or attaching the second encrypted data, and wherein sending the second encrypted data to the selected address comprises sending the email to the email address.

12. The apparatus of claim 11, wherein the at least one storage medium further stores one or more addresses corresponding to one or more user accounts, and wherein selecting the address based, at least in part, on the user account used to provide the request for the information comprises selecting, from the one or more addresses, the address corresponding to the user account.

13. The apparatus of claim 1, wherein the first communication channel comprises a logical communication channel between the apparatus and a computing device operated by the user, and wherein a first portion of the logical communication channel is between the computing device operated by the user and a server, and wherein the second portion of the logical communication channel is between the server and the apparatus.

14. The apparatus of claim 13, wherein the logical communication channel is a first logical communication channel, and wherein the second communication channel comprises a second logical communication channel between the apparatus and a computing device operated by the user, and wherein the second logical communication channel does not include the server.

15. A system comprising:
a first computing device, including:
at least one first processing circuit, and
at least one first storage medium storing instructions that, when executed by the at least one first processing circuit, cause the first computing device to perform first steps including:
receiving, through a first communication channel, a request for information, the request provided using an account of a user,
decrypting first encrypted data comprising at least a portion of the requested information, the first encrypted data being encrypted with a first asymmetric encryption key,
encrypting the at least a portion of the requested information with a second asymmetric encryption key different from the first asymmetric encryption key to obtain second encrypted data comprising the at least a portion of the requested information,
sending the second encrypted data comprising the at least a portion of the requested information to the user through a second communication channel different from the first communication channel,
receiving, through a third communication channel that is different from the first and second communication channels from a payment services provider (PSP), instructions to send the at least a portion of the requested information to the PSP, the at least a portion of the requested information corresponding to information requested using the account of the user;
decrypting the first encrypted data comprising the at least a portion of the requested information corresponding to information requested using the account of the user;
encrypting the at least a portion of the requested information with a third asymmetric encryption key different from the first and second asymmetric encryption keys to obtain third encrypted data comprising the at least a portion of the requested information, the at least a portion of the requested information corresponding to information requested using the account of the user; and
sending the third encrypted data comprising the at least a portion of the requested information to the PSP through the third communication channel; and
a second computing device communicatively coupled to the first computing device.

16. The system of claim 15, wherein the second computing device includes:
at least one second processing circuit; and
at least one second storage medium storing instructions that, when executed by the at least one second processing circuit, cause the second computing device to perform second steps including:
receiving one or more authentication factors provided by the user, and
using the one or more authentication factors to authenticate the user.

17. The system of claim 16, wherein the second steps further include:
receiving the request for information, and
in response to receiving the request for information:
retrieving the first encrypted data from the at least one second storage device, and
sending the request for information and the first encrypted data to the first computing device.

18. The system of claim 17, wherein second steps further include:
in response to receiving the request for information, storing an audit record of the request for information.

19. A method comprising:
receiving, through a first communication channel, a request for information, the request provided using an account of a user;
using at least one processor executing stored instructions, applying a decryption protocol to decrypt first encrypted data comprising at least a portion of the requested information, the first encrypted data being encrypted with a first asymmetric encryption key;

using at least one processor executing stored instructions, applying an encryption protocol to encrypt the at least a portion of the requested information with a second asymmetric encryption key different from the first asymmetric encryption key to obtain second encrypted data comprising the at least a portion of the requested information;

sending the second encrypted data comprising the at least a portion of the requested information to the user through a second communication channel different from the first communication channel;

receiving, through a third communication channel that is different from the first and second communication channels from a payment services provider (PSP), instructions to send the at least a portion of the requested information to the PSP, the at least a portion of the requested information corresponding to information requested using the account of the user;

decrypting the first encrypted data comprising the at least a portion of the requested information;

encrypting the at least a portion of the requested information with a third asymmetric encryption key different from the first and second asymmetric encryption keys to obtain third encrypted data comprising the at least a portion of the requested information; and sending the third encrypted data comprising the at least a portion of the requested information to the PSP through the third communication channel.

20. The method of claim 19, wherein the user is a first user, and wherein the requested information comprises authentication information and/or financial account information of one or more second users.

21. The method of claim 19, wherein the method further comprises selecting an address based, at least in part, on the user account used to provide the request for the information, and wherein sending the second encrypted data to the user through the second communication channel comprises sending the second encrypted data to the selected address through the second communication channel.

22. The method of claim 21, wherein the address comprises an email address, wherein the method further comprises generating an email including and/or attaching the second encrypted data, and wherein sending the second encrypted data to the selected address comprises sending the email to the email address.

* * * * *